(12) United States Patent
    Thakkar et al.

(10) Patent No.: US 12,573,402 B2
(45) Date of Patent: Mar. 10, 2026

(54) GENERATING AND/OR UTILIZING UNINTENTIONAL MEMORIZATION MEASURE(S) FOR AUTOMATIC SPEECH RECOGNITION MODEL(S)

(71) Applicant: GOOGLE LLC, Mountain View, CA (US)

(72) Inventors: Om Dipakbhai Thakkar, San Jose, CA (US); Hakim Sidahmed, Washington, DC (US); W. Ronny Huang, Kensington, MD (US); Rajiv Mathews, Sunnyvale, CA (US); Françoise Beaufays, Mountain View, CA (US); Florian Tramèr, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 416 days.

(21) Appl. No.: 17/710,137

(22) Filed: Mar. 31, 2022

(65) Prior Publication Data
    US 2023/0317082 A1     Oct. 5, 2023

(51) Int. Cl.
    *G10L 15/26*    (2006.01)
    *G10L 13/02*    (2013.01)
    *G10L 15/06*    (2013.01)

(52) U.S. Cl.
    CPC .............. *G10L 15/26* (2013.01); *G10L 13/02* (2013.01); *G10L 15/063* (2013.01)

(58) Field of Classification Search
    CPC ....... G10L 15/26; G10L 13/02; G10L 15/063; G10L 15/01; G10L 13/00; G06F 21/6245
    See application file for complete search history.

(56) References Cited

U.S. PATENT DOCUMENTS

2011/0016110 A1*   1/2011   Egi ..................... G06F 21/6227
                                                      707/723
2014/0163981 A1*   6/2014   Cook ..................... G10L 15/26
                                                      704/235
                    (Continued)

FOREIGN PATENT DOCUMENTS

JP        2011022705        2/2011
WO        2020229684       11/2020
                    (Continued)

OTHER PUBLICATIONS

Thakkar et al. "Understanding unintended memorization in language models under federated learning." Proceedings of the Third Workshop on Privacy in Natural Language Processing. 2021 (https://aclanthology.org/2021.privatenlp-1.1.pdf). (Year: 2020).*
                    (Continued)

*Primary Examiner* — Pierre Louis Desir
*Assistant Examiner* — Keisha Y. Castillo-Torres
(74) *Attorney, Agent, or Firm* — Gray Ice Higdon

(57)        ABSTRACT

An unintentional memorization measure can be used to determine whether an automatic speech recognition (ASR) model has unintentionally memorized one or more phrases during training of the ASR model. Various implementations include generating one or more candidate transcripts based on the vocabulary of the ASR model. For example, the system can generate a candidate transcript by appending a token of the vocabulary to a previous candidate transcript. Various implementations include processing the candidate transcript using a speech synthesis model to generate synthesized speech audio data that includes synthesized speech of the candidate transcript. Additionally or alternatively, the synthesized speech audio data can be processed using the ASR model to generate ASR output. Various implementa- (Continued)

tions can include generating a loss based on comparing the ASR output and the candidate transcript.

16 Claims, 9 Drawing Sheets

(56) References Cited

U.S. PATENT DOCUMENTS

| | | | |
|---|---|---|---|
| 2022/0068255 A1* | 3/2022 | Chen | G10L 13/08 |
| 2023/0169954 A1* | 6/2023 | Thomas | G10L 15/16 704/200 |

FOREIGN PATENT DOCUMENTS

| | | |
|---|---|---|
| WO | 2021006920 | 1/2021 |
| WO | 2021081061 | 4/2021 |
| WO | 2021101501 | 5/2021 |
| WO | 2021234839 | 11/2021 |

OTHER PUBLICATIONS

Huang, W.R. et al., "Detecting Unintended Memorization in Language-Model-Fused ASR"; arXiv.org, Cornell University Library; arXiv:2204.09606; 6 pages; dated Apr. 20, 2022.
Carlini, N. et al., "The Secret Sharer: Evaluating and Testing Unintended Memorization in Neural Networks"; arXiv.org, Cornell University Library; arXiv:1802.08232; 18 pages; dated Feb. 22, 2018.
European Patent Office; International Search Report and Written Order issued in Application No. PCT/US2022/047275; 13 pages; dated Dec. 21, 2022.
European Patent Office, Intention to Grant issued in Application No. 22809262.3; 59 pages; dated Feb. 14, 2025.
Giulia Garau "Speaker Normalisation for Large Vocabulary Multi-party Conversational Speech Recognition" University of Edinburgh. 2009. 190 pages.
Cho et al., "Learning Speaker Embedding from Text-to-Speech" arXiv:2010.11221v1 [eess.AS] 5 pages, dated Oct. 21, 2020.
Dang et al., "A Method to Reveal Speaker Identity in Distributed ASR Training, and How to Counter It" arXiv:2104.07815v1 [cs.CL] 16 pages, dated Apr. 15, 2021.
Yu Zhang "Exploring Neural Network Architectures For Acoustic Modeling" Massachusetts Institute of Technology. 132 pages, dated Sep. 2017.
Japanese Patent Office, Notice of Refusal issued in Application No. 2024556755, 10 pages, dated Aug. 26, 2025.

* cited by examiner

300

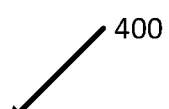

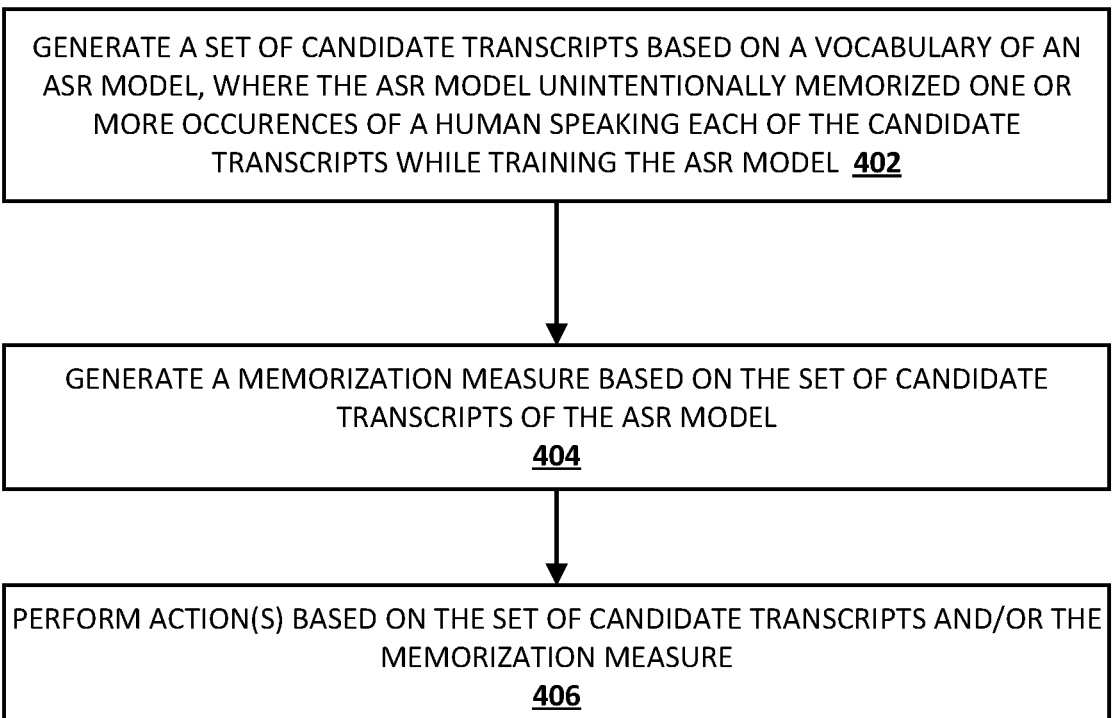

GENERATE A SET OF CANDIDATE TRANSCRIPTS BASED ON A VOCABULARY OF AN ASR MODEL, WHERE THE ASR MODEL UNINTENTIONALLY MEMORIZED ONE OR MORE OCCURENCES OF A HUMAN SPEAKING EACH OF THE CANDIDATE TRANSCRIPTS WHILE TRAINING THE ASR MODEL __402__

GENERATE A MEMORIZATION MEASURE BASED ON THE SET OF CANDIDATE TRANSCRIPTS OF THE ASR MODEL
__404__

PERFORM ACTION(S) BASED ON THE SET OF CANDIDATE TRANSCRIPTS AND/OR THE MEMORIZATION MEASURE
__406__

FIG. 4

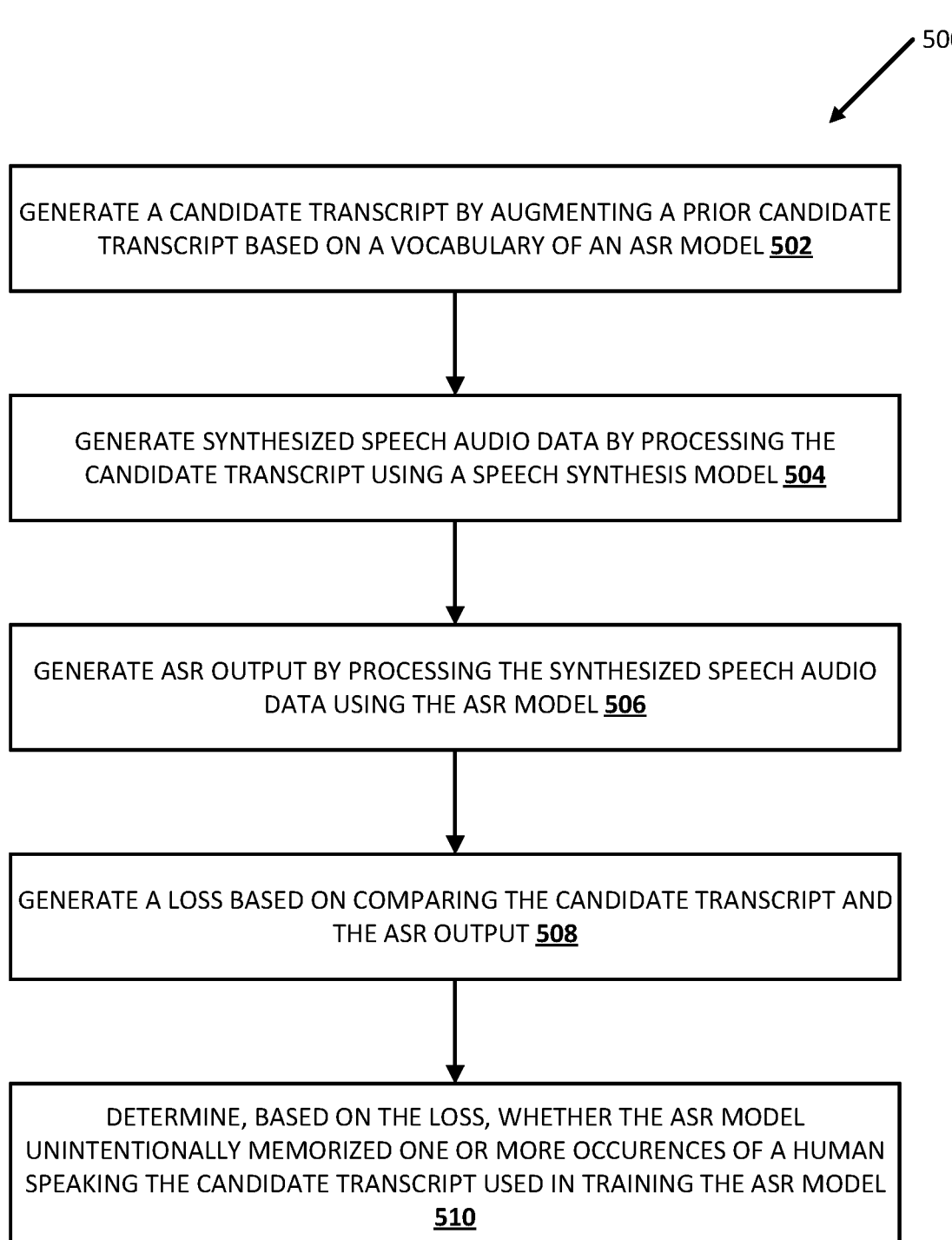

500

GENERATE A CANDIDATE TRANSCRIPT BY AUGMENTING A PRIOR CANDIDATE
TRANSCRIPT BASED ON A VOCABULARY OF AN ASR MODEL 502

GENERATE SYNTHESIZED SPEECH AUDIO DATA BY PROCESSING THE
CANDIDATE TRANSCRIPT USING A SPEECH SYNTHESIS MODEL 504

GENERATE ASR OUTPUT BY PROCESSING THE SYNTHESIZED SPEECH AUDIO
DATA USING THE ASR MODEL 506

GENERATE A LOSS BASED ON COMPARING THE CANDIDATE TRANSCRIPT AND
THE ASR OUTPUT 508

DETERMINE, BASED ON THE LOSS, WHETHER THE ASR MODEL
UNINTENTIONALLY MEMORIZED ONE OR MORE OCCURENCES OF A HUMAN
SPEAKING THE CANDIDATE TRANSCRIPT USED IN TRAINING THE ASR MODEL
510

FIG. 5

GENERATING AND/OR UTILIZING UNINTENTIONAL MEMORIZATION MEASURE(S) FOR AUTOMATIC SPEECH RECOGNITION MODEL(S)

BACKGROUND

Voice-based user interfaces are increasingly being used in the control of computers and other electronic devices. Voice-based user interfaces have continued to evolve from early rudimentary interfaces that could only understand simple and direct commands to more sophisticated interfaces that respond to natural language requests and that can understand context and manage back-and-forth dialogs or conversations with users. Many voice-based user interfaces perform speech recognition (e.g., using an automatic speech recognition model) on a spoken utterance to generate corresponding text, perform a semantic analysis of the text in an attempt to determine the meaning of the spoken utterance, and/or undertake one or more actions based on the determined meaning. However, an automatic speech recognition model can unintentionally memorize the underlying data used in training the model.

SUMMARY

Implementations described herein are directed towards generating an unintentional memorization measure, for an automatic speech recognition ("ASR") model, that indicates the extent one or more phrases were unintentionally memorized by the ASR model during training. While training, ASR models can unintentionally memorize rare or unique sequences in the training data. In some implementations, the unintentionally memorized sequences can include sensitive information about a user. For example, ASR models can unintentionally memorize a training instance based on a user speaking the utterance "My username is PatentsForLife and my password is I Love Patents". Subsequent to training the ASR model, the system can process an additional instance of a user (the same user who spoke the training instance and/or an additional user) speaking the utterance "My username is PatentsForLife and my password is I Love Patents" to generate a text representation of "My username is Patents-ForLife and my password is I Love Patents". In some implementations, the ASR model can generate the text representation by generating one or more probabilities indicating a probability word(s) are captured in the spoken utterance. For example, the ASR model can generate several candidate text representations of the utterance, and can select the text representation of the utterance based on the generated probabilities.

When the ASR model unintentionally memorizes a training utterance, the ASR model can generate very high probabilities corresponding to the text representation of the memorized utterance. For example, the system can determine that when the probability of whether the text representation is captured in the utterance satisfies a threshold value, the ASR model unintentionally memorized the text representation. For example, the system can determine the ASR model unintentionally memorized the text representation when the corresponding probability is greater than 0.99, greater than 0.95, greater than 0.9, greater than 0.85, satisfies one or more additional threshold values, and/or combinations thereof. In other words, the system can determine the ASR model unintentionally memorized a text representation when the probabilities generated using the ASR model are very high.

In some implementations, the system can determine the probability (e.g., generated by processing audio data capturing the utterance using the ASR model) the text representation of "My username is PatentsForLife and my password is I Love Patents" is 0.98. In some of those implementations, the system can determine whether 0.98 satisfies a threshold value of 0.95, where probabilities greater than the threshold value indicate the ASR model unintentionally memorized the utterance. In response to determining the probability 0.98 exceeds the threshold value of 0.95, the system can determine that the ASR model unintentionally memorized the utterance of "My username is PatentsForLife and my password is I Love Patents".

In some implementations, in generating an unintentional memorization measure, the system can generate a set of candidate transcripts, where each candidate transcript indicates a potential unintentional memorization by the ASR model. The system can generate the set of candidate transcripts based on the vocabulary of the ASR model. In some implementations, a candidate transcript can be generated based on a prior candidate transcript and a token of the vocabulary of the ASR model. The token of the vocabulary can include one or more words, one or more word-pieces, one or more phonemes, one or more letters, one or more additional portions of the vocabulary, and/or combinations thereof. For instance, the system can generate a candidate transcript by appending a word in the vocabulary to a prior candidate transcript (e.g., one satisfying one or more criteria). Additionally or alternatively, the system can generate multiple candidate transcripts, based on the same prior candidate transcript, by augmenting different portions of the vocabulary onto each candidate transcript.

As an illustrative example, the system can generate multiple candidate transcripts based on the prior candidate transcript of "what does the". A first candidate transcript of "what does the mouse" can be generated based on appending the word "mouse" onto the prior candidate transcript of "what does the". Similarly, a second candidate transcript of "what does the fish" can be generated based on appending the word "fish" onto the prior candidate transcript of "what does the". Furthermore, a third candidate transcript of "what does the seal" can be generated based on appending the word "seal" onto the prior candidate transcript of "what does the". One or more additional or alternative candidate transcripts can be generated based on appending additional word(s) to the prior candidate transcript.

In some implementations, the candidate transcript can be processed using a speech synthesis model to generate synthesized speech audio data which includes synthesized speech of the candidate transcript. The audio data can be processed using the ASR model to generate ASR output (e.g., a candidate text representation of the synthesized speech, a probability measure corresponding to the candidate text representation of the synthesized speech, a corresponding probability measure for each word of the candidate text representation etc.). In some implementations, a loss can be generated based on comparing the candidate transcript with the corresponding ASR output.

In furtherance of the previous example, the first candidate transcript of "what does the mouse" can be processed using a speech synthesis model to generate first synthesized speech audio data which includes a synthesized spoken representation of "what does the mouse". Similarly, the second candidate transcript of "what does the fish" can be processed by the speech synthesis model to generate second synthesized speech audio data which includes a synthesized spoken representation of "what does the fish". Additionally or alternatively, the third candidate transcript of "what does the seal" can be processed using the speech synthesis model to generate the third synthesized speech audio data which includes a synthesized spoken representation of "what does the seal".

In some implementations, the system can process the synthesized speech audio data, which includes the synthesized speech of the candidate transcript, using the ASR model to generate corresponding ASR output. For instance, the system can process the first synthesized speech audio data using the ASR model to generate first ASR output including a first candidate text representation of "what does the mouse"; the system can process the second synthesized speech audio data using the ASR model to generate second ASR output including a second candidate text representation of "what does the fish"; and the system can process the third synthesized speech audio data using the ASR model to generate third ASR output including a third candidate text representation of "what does the seal".

In some implementations, the system can determine a loss based on comparing the candidate transcript and the ASR output. For example, the system can determine a first loss of 0.05 based on comparing the first candidate transcript of "what does the mouse" with the first ASR output; the system can determine a second loss of 0.1 based on comparing the second candidate transcript of "what does the fish" with the second ASR output; and the system can determine a third loss of 0.01 based on comparing the third candidate transcript of "what does the seal" with the third ASR output.

The system can use the generated loss in a variety of ways in accordance with some implementations. For instance, the system can determine whether to use a candidate transcript to generate a further candidate transcript by augmenting one or more additional tokens from the vocabulary of the ASR model to the candidate transcript. In some implementations, the system can compare the losses of multiple candidate transcripts and select one or more of the candidate transcripts where the loss satisfies one or more conditions, such as the smallest loss, the smallest two losses, the smallest three losses, one or more additional conditions, and/or combinations thereof.

For example, the system can compare the losses described above of the first loss of 0.05, the second loss of 0.1 and the third loss of 0.01 and, based on the smallest loss of 0.01, can select the third candidate transcript of "what does the seal" for additional augmentation. For instance, the system can augment the third candidate transcript of "what does the seal" with the additional word from the vocabulary of the ASR model to generate a further candidate transcript of "what does the seal say". In some implementations, the system can generate multiple further candidate transcripts, where each further transcript is augmented with a distinct word from the vocabulary. For example, the system can generate a first further candidate transcript of "what does the seal say" by augmenting "what does the seal" with the word "say"; the system can generate a second further candidate transcript of "what does the seal eat" by augmenting "what does the seal" with the word "eat"; and the system can generate a third further candidate transcript of "what does the seal dig". In some of those implementations, the system can process each further candidate transcript using the speech synthesis model to generate corresponding further synthesized speech audio data, and can process the further synthesized speech audio data using the ASR model to generate corresponding further ASR output. Additionally or alternatively, the system can determine a further loss corresponding to each further candidate transcript based on comparison of the further candidate transcript with the corresponding further ASR loss. The further losses can be used in accordance with a variety of ways described herein.

Additionally or alternatively, the system can use the loss corresponding to a particular candidate transcript to determine whether the ASR model unintentionally memorized one or more occurrences of a user speaking the candidate transcript in training data used to train the ASR model. For example, the system can identify a set of candidate transcripts based on the corresponding losses, such as identifying a set of candidate transcripts with the smallest corresponding losses as described above. In some implementations, the system can compare each identified candidate transcript with the set of training instances used to train the ASR model. A candidate transcript corresponding to a training instance can indicate the ASR model may have unintentionally memorized the training instance. For example, the system can compare the candidate transcript of "what does the seal say" with the training instances used to train the ASR model. The system can identify one or more occurrences (or no occurrences) in the training instances of a user speaking the spoken utterance "what does the seal say".

In some implementations, the memorization measure can be based on the number of candidate transcripts that correspond to one or more occurrences of a user speaking the candidate transcript in the training data used to train the ASR model. For instance, the unintentional memorization measure can be based on the number of candidate transcripts that correspond to one or more training instances. In some of those implementations, a lower memorization measure indicates less unintentional memorization by the ASR model.

The system can use the memorization measure in evaluating one or more ASR models. In some implementations, the system can use the memorization measure to compare several ASR models. For example, the system can determine a first memorization measure corresponding to a first ASR model trained using a first set of training instances and as a second memorization model corresponding to a second ASR model trained using a second set of training instances. The system can compare the unintended memorization in the first ASR model compared to the second ASR model based on a comparison of the first memorization measure and the second memorization measure.

Additionally or alternatively, the system can use the memorization measure to determine whether additional training has changed (e.g., increased, decreased, no change, etc.) the unintentional memorization of an ASR model. For example, the system can generate a prior memorization measure corresponding to an ASR model prior to training the ASR model with additional training. A subsequent memorization measure corresponding to the ASR model can be generated prior to the additional training. In some implementations, the additional training of the ASR model can be evaluated based on a comparison of the prior memorization measure and the subsequent memorization measure.

In some implementations, the ASR model can be trained based on one or more federated learning techniques. For example, an on-device ASR model can be stored locally at the client device of a user, and a cloud-based global ASR model can be stored remotely at a remote system (e.g., in a server, in a cluster of servers, etc.). The client device can process input detected at the client device to generate a prediction, and can compare the prediction to ground truth output to generate a client gradient. Additionally or alternatively, the client device can transmit, to the remote system, a client ASR model update that is based on the client gradient. The remote system can use the client model update, and optional additional client ASR model updates from additional client devices, to update one or more weights of the global ASR model. In some implementations, the system can transmit the updated global ASR model and/or updated weights of the global ASR model to the client device and/or other client devices. Each client device can replace the on-device ASR model with the global ASR model, or replace the weights of the on-device ASR model with the updated weights of the global ASR model, thereby updating the on-device ASR model.

In some implementations, the system can determine an initial memorization measure indicating one or more unintentional memorization by the global ASR model prior to updating the global ASR model based on the client ASR model update(s). Subsequent to updating one or more weights of the global ASR model, the system can determine an updated memorization measure. In some implementations, the system can determine whether to transmit the updated global ASR model and/or updated weight(s) of the global ASR model based on comparing the initial memorization measure with the updated memorization measure.

In some of those implementations, the system can determine to transmit the updated global ASR model based on comparing the initial memorization measure with the updated memorization measure. For example, the system can determine an initial memorization measure of 10 and can determine an updated memorization measure of 5, which can indicate less unintentional memorization in the updated global ASR model compared to the initial global ASR model. In some implementations, the system can transmit the updated global ASR model based on a determination that the updated global ASR model decreases the amount of unintentional memorization. Additionally or alternatively, the system can transmit the updated global ASR model based on a determination that the updated global ASR model does not change the amount of unintentional memorization, increases the amount of unintentional memorization within a threshold value, etc.

In some other implementations, the system can determine to not transmit the updated global ASR model based on comparing the initial memorization measure with the updated memorization measure. For example, the system can determine an initial memorization measure of 100 and can determine an updated memorization measure of 5000, which can indicate more unintentional memorization in the updated global ASR model compared to the initial global ASR model. In other words, the increased memorization measure of the updated memorization measure can indicate an ASR model more likely to unintentionally leak sensitive data. In some of those implementations, the system can determine to not update the client ASR model based on the determining the updated global ASR model has an increased amount of unintentional memorization compared to the initial ASR model.

Furthermore, in some implementations, one or more targeted training instances can be inserted into the training data used to train the ASR model. The targeted training instances can include atypical phrases, phrases likely to be unintentionally memorized, phrases memorized by other systems, etc. In some implementations, the system can compare the candidate transcripts with the targeted training instances to determine whether the ASR model unintentionally memorized the targeted training instance during training. For example, a targeted training instance of "My name is John Doe and my credit card number is 1234567890" can be used in training the ASR model. The system can generate a set of candidate transcripts as described herein. In some of those implementations, the system can determine whether a candidate transcript of "My name is John Doe and my credit card number is 1234567890" was generated, indicating the ASR model memorized the targeted training instance.

In some implementations, the system can compare the probability of a given candidate transcript generated using an ASR model with measure(s), for the given candidate transcript, that are generated using additional ASR model(s). For example, the measure(s) can be based on one or more probabilities, where each of the probabilities is a corresponding probability, of the given candidate transcript, generated using a corresponding additional ASR model. For example, the system can compare the probability generated by the ASR model indicating the likelihood the given candidate transcript is captured in the audio data with a further probability generated using an additional ASR model indicating the likelihood the candidate transcript is captured in the audio data. If the candidate transcript has a high probability across multiple ASR models, the candidate transcript is less likely to indicate an unintentional memorization and/or conversely is more likely to indicate the candidate transcript is a commonly spoken phrase. Put another way, in determining whether the probability of a given candidate transcript, generated using an ASR model, indicates unintentional memorization, that probability can be calibrated based on one or more other probabilities, for the given candidate transcript, that are similarity generated using one or more additional ASR models. In these and other manners, whether a given probability indicates unintentional memorization can vary from transcript to transcript, in dependence on a calibration that is specific to the corresponding transcript and that is based on one or more other probabilities from other ASR model(s).

As a particular example, audio data capturing a spoken utterance of "turn off the kitchen lights" can be processed using a first ASR model to generate a candidate transcript of "turn off the kitchen lights" with a corresponding probability of 0.98. Similarly, the audio data capturing the spoken utterance of "turn off the kitchen lights" can be processed using a second ASR model to generate a candidate transcript of "turn off the kitchen lights" with a corresponding probability of 0.99. Furthermore, the audio data capturing the spoken utterance of "turn off the kitchen lights" can be processed using a third ASR model to generate a candidate transcript of "turn off the kitchen lights" with a corresponding probability of 0.997. The candidate transcript has a high probability corresponding to the first ASR model (0.98), the second ASR model (0.99), and the third ASR model (0.997). In some implementations, this high probability across several ASR models indicates the candidate transcript of "turn off the kitchen lights" is a commonly spoken phrase and/or is not an unintentional memorization by one or more of the ASR models.

As one example, the system can compare the probabilities generated using the additional ASR model(s) (e.g., the second ASR model, the third ASR, one or more additional ASR models, etc.) model to determine an expected probability measure. For example, the expected probability measure can be an average probability measure (e.g., the average of the second ASR model probability measure (0.99) and the third ASR probability measure (0.997) of 0.9935), a mean probability measure, a mean probability measure, a weighted probability measure, one or more probability measures, and/or combinations thereof. The system can compare the expected probability measure with the probability measure corresponding to the probability measure generated using the ASR model the system is processing to identify unintentional memorization. In some implementations, the system can determine whether the ASR model unintentionally memorized the candidate transcript based on determining whether the corresponding probability measure and the expected probability measure satisfies one or more conditions, such as whether the corresponding measure is within a threshold distance of the expected probability measure. In some implementations, the system can determine the ASR model unintentionally memorized the candidate transcript if the difference between the corresponding probability measure and the expected probability measure are greater than a threshold value (e.g., the difference is greater than 0.5, 0.2, 0.1, etc.). In some other implementations, the system can determine the ASR model did not unintentionally memorize the candidate transcript if the difference between the corresponding probability measure and the expected probability measure are less than a threshold value (e.g., the difference is less than 0.05, 0.1, 0.15, 0.2, etc.).

For instance, the system can compare the probability measure of the first ASR model (0.98) with the expected probability measure based on the average of the probability measure of the second ASR model and the third ASR model (0.9935). Additionally or alternatively, the system can determine whether the difference between the corresponding probability measure and the expected probability measure (0.0035) is greater than or less than a threshold value of 0.1. In response to determining the difference (0.0035) is less than the threshold value (0.1), the system can determine the first ASR model did not unintentionally memorize the candidate transcript.

Conversely, audio data capturing a spoken utterance of "my username is 'PatentsAreTheBest' and my password is 'ILovePatents'" can be processed using the first ASR model to generate a candidate transcript of "my username is 'PatentsAreTheBest' and my password is 'ILovePatents'" with a corresponding probability of 0.999. Additionally or alternatively, the audio data capturing the spoken utterance of "my username is 'PatentsAreTheBest' and my password is 'ILovePatents'" can be processed using the second ASR model to generate a candidate transcript of "my username is 'PatentsAreTheBest' and my password is 'ILovePatents'" with a corresponding probability of 0.7. Furthermore, the audio data capturing the spoken utterance of "my username is 'PatentsAreTheBest' and my password is 'ILovePatents'" can be processed using the third ASR model to generate a candidate transcript of "my username is 'PatentsAreThe-Best' and my password is 'ILovePatents'" with a corresponding probability of 0.79. In some implementations, the high probability (e.g., 0.999) corresponding to the first ASR model and the (relatively) low probabilities corresponding to the second ASR model and the third ASR model (e.g., 0.7 and 0.79 respectively) can indicate the first ASR model unintentionally memorized one or more training instances capturing a user speaking "my username is 'PatentsAreThe-Best' and my password is 'ILovePatents'".

As an additional example, the system can compare the probabilities generated using the additional ASR model(s) (e.g., the second ASR model, the third ASR model, one or more additional ASR models, etc.). For example, the expected probability can be an average probability measure, a mean probability measure (e.g., the average of the second ASR model probability measure (0.7) and the third ASR model probability measure (0.79) of 0.745), a weighted probability measure, one or more probability measures, and/or combinations thereof. Similarly, the system can compare the expected probability measure with the probability measure generated using the ASR model the system is processing to identify unintentional memorization. In some implementations, the system can determine whether the ASR model unintentionally memorized the candidate transcript based on determining whether the corresponding probability measure and the expected probability measure satisfies one or more conditions, such as whether the corresponding measure is within a threshold distance of the expected probability measure. In some implementations, the system can determine the ASR model unintentionally memorized the candidate transcript if the difference between the corresponding probability measure and the expected probability measure are greater than a threshold value (e.g., the difference is greater than 0.5, 0.2, 0.1, etc.). In some other implementations, the system can determine the ASR model did not unintentionally memorize the candidate transcript if the difference between the corresponding probability measure and the expected probability measure are less than a threshold value (e.g., the difference is less than 0.05, 0.1, 0.15, 0.2, etc.).

For instance, the system can compare the probability of the first ASR model (0.999) with the expected probability measure based on the average of the probability of the second ASR model and the third ASR model (0.745). In some implementations, the system can determine whether the difference between the corresponding probability measure and the expected probability measure (0.254) is greater than or less than a threshold value of 0.2. In response to determining the difference (0.254) is greater than the threshold value (0.2), the system can determine the first ASR model unintentionally memorized the candidate transcript.

Although the previous examples are described with respect to comparing a probability measure generated using a given ASR model with one or more additional probability measures generated using one or more ASR models, this is merely illustrative. In some implementations, the system can compare one or more portions of ASR output, such as output generated by processing the synthesized speech audio data which includes synthesized speech of a candidate transcript using the ASR model, with additional ASR output generated based on processing the synthesized speech audio data using one or more additional ASR models. The ASR output can include a probability indicating the likelihood the synthesized speech audio data includes the candidate transcript, a confidence score indicating the confidence of the ASR output, a representation of the loss generated while training the ASR model, one or more additional or alternative outputs, and/or combinations thereof. For instance, a loss generated while training a first ASR model can be compared with a loss generated while training a second ASR model and a loss generated while training a third ASR model (e.g., an average loss based on the loss corresponding to the second ASR model and the loss corresponding to the third ASR model). In some of those implementations, the system can determine whether a candidate transcript was unintentionally memorized by the first ASR model based on determining whether the difference between the loss corresponding to the first ASR model and the average loss (based on the loss corresponding to the second ASR model and the loss corresponding to the third ASR model) satisfy one or more conditions, such as whether the difference satisfies a threshold value (as described above with respect to probability measures).

In some implementations, the system can generate a set of potential candidate transcripts which may have been unintentionally memorized by an ASR model for a third party. For example, the system can generate a set of potential candidate transcripts with high corresponding probabilities using the third party ASR model. The third party can determine whether each of the candidate transcripts, in the set of potential candidate transcripts, is an unintentional memorization by the third party ASR model.

Accordingly, various implementations set forth techniques for identification of unintentional memorization in an ASR model. ASR models can be trained with real world training instances. These training instances may unintentionally include sensitive information (e.g., passwords, credit card numbers, birthdays, etc.). An unintentional memorization by an ASR model can unintentionally leak this sensitive information. Various implementations described herein can be used to identify a set of candidate transcripts which may indicate an unintentional memorization by the corresponding ASR model. In some of those implementations, a memorization measure for the ASR model can be generated based on the set of candidate transcripts. The memorization measure can be used, for example, to identify whether an ASR model is likely to leak personal information if deployed. Additionally or alternatively, a user can more confidently share interactions with the system to further refine the ASR model by preventing the unintentional leak of sensitive information.

The above description is provided only as an overview of some implementations disclosed herein. These and other implementations of the technology are disclosed in additional detail below. It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 is a flowchart illustrating a process of performing actions based on a set of candidate transcripts and/or a memorization measure in accordance with various implementations disclosed herein.

FIG. 5 is a flowchart illustrating a process of determining whether an ASR model unintentionally memorized an occurrence of a human speaking a candidate transcript in accordance with various implementations disclosed herein.

DETAILED DESCRIPTION

Figure 1A:
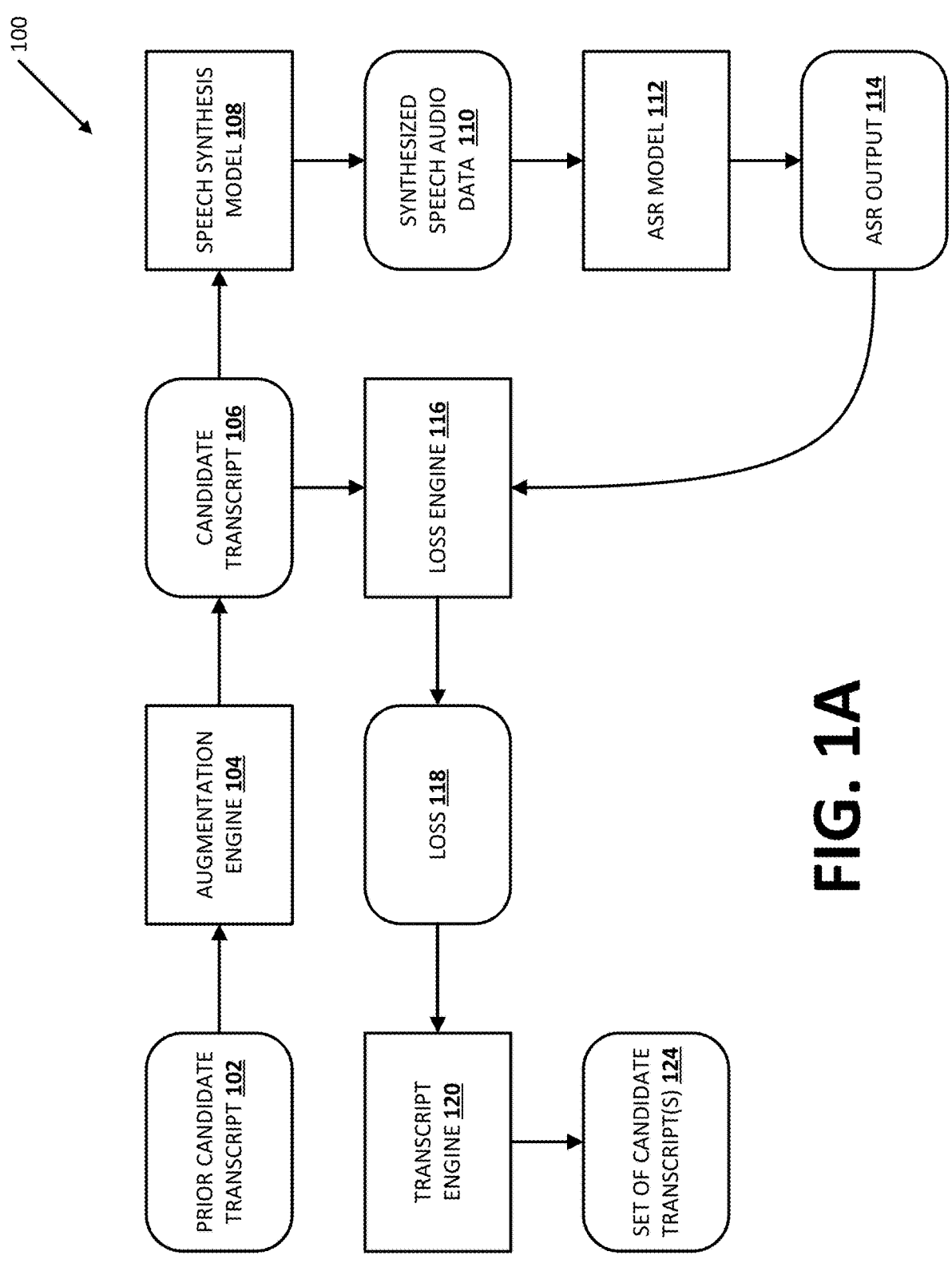
FIG. 1A illustrates an example of generating a set of candidate transcripts in accordance with various implementations disclosed herein.

Turning to the figures, FIG. 1A illustrates an example 100 of generating a set of candidate transcripts in accordance with various implementations. Example 100 includes processing a prior candidate transcript 102 using augmentation engine 104 to generate a candidate transcript 106. In some implementations, at an initial iteration, the prior candidate transcript can be seeded with a token of a vocabulary corresponding to the ASR model. In some implementations, the token can be one or more words, one or more word-pieces, one or more letters, one or more phonemes, one or more additional portions of the vocabulary, and/or combinations thereof. In some implementations, the augmentation engine 104 can augment the prior candidate transcript 102 with an additional token from the vocabulary to generate the candidate transcript 106. For example, the system can augment the prior candidate transcript of "my name is John" with the word "Doe" from the vocabulary of the ASR model to generate the candidate transcript of "my name is John Doe". In some implementations, the system can generate multiple candidate transcripts from the same prior candidate transcript. An example of generating multiple candidate transcripts from the prior candidate transcript is described herein with respect to FIG. 1B.

Additionally or alternatively, the system can process the candidate transcript 106 using a speech synthesis model 108 to generate synthesized speech audio data 110. For example, the system can process the candidate text representation of "my name is John Doe" using a speech synthesis model to generate the synthesized speech audio data that includes a synthesized utterance of "my name is John Doe". The synthesized speech audio data 110 can be processed using the ASR model 112 to generate ASR output 114. In some implementations, the vocabulary corresponding to the ASR model 112 can be used by augmentation engine 104 in generating the candidate transcript 106. The ASR output 114 can include a candidate text representation of the synthesized speech, one or more alternative candidate text representations of the synthesized speech, a probability of the candidate text representation, a probability of one or more words of the candidate text representation, one or more additional outputs, and/or combinations thereof.

In some implementations, the system can process the candidate transcript 106 and the ASR output 114 using a loss engine 116 to generate a loss 118 corresponding to the candidate transcript 106. For example, the loss engine 116 can compare the text of the candidate transcript 106 with the text of a candidate text representation of the ASR output 114. In some implementations, the system can generate the loss 118 based on the comparison of the text of the candidate transcript 106 with the text of the candidate text representation of the ASR output 114.

In some implementations, the system can use transcript engine 120 to determine whether to add the candidate transcript 106 to the set of candidate transcripts 124. In some of those implementations, each candidate transcript in the set of candidate transcripts 124 can be used as a prior candidate transcript in a next iteration of generating candidate transcript(s). For instance, the transcript engine 120 can select one or more candidate transcripts based on the corresponding loss 118. For example, the system can select a predefined number of candidate transcripts with the smallest losses, a predefined number of candidate transcripts with the largest losses, each candidate transcript that is smaller than a predefined loss, each candidate transcript that is larger than a predefined loss, one or more additional loss metrics, and/or combinations thereof. In some other implementations, transcript engine 120 can determine whether the candidate transcript has reached a predefined length and/or whether the candidate transcript includes an end of sentence character in the vocabulary of the ASR model.

Figure 1B:
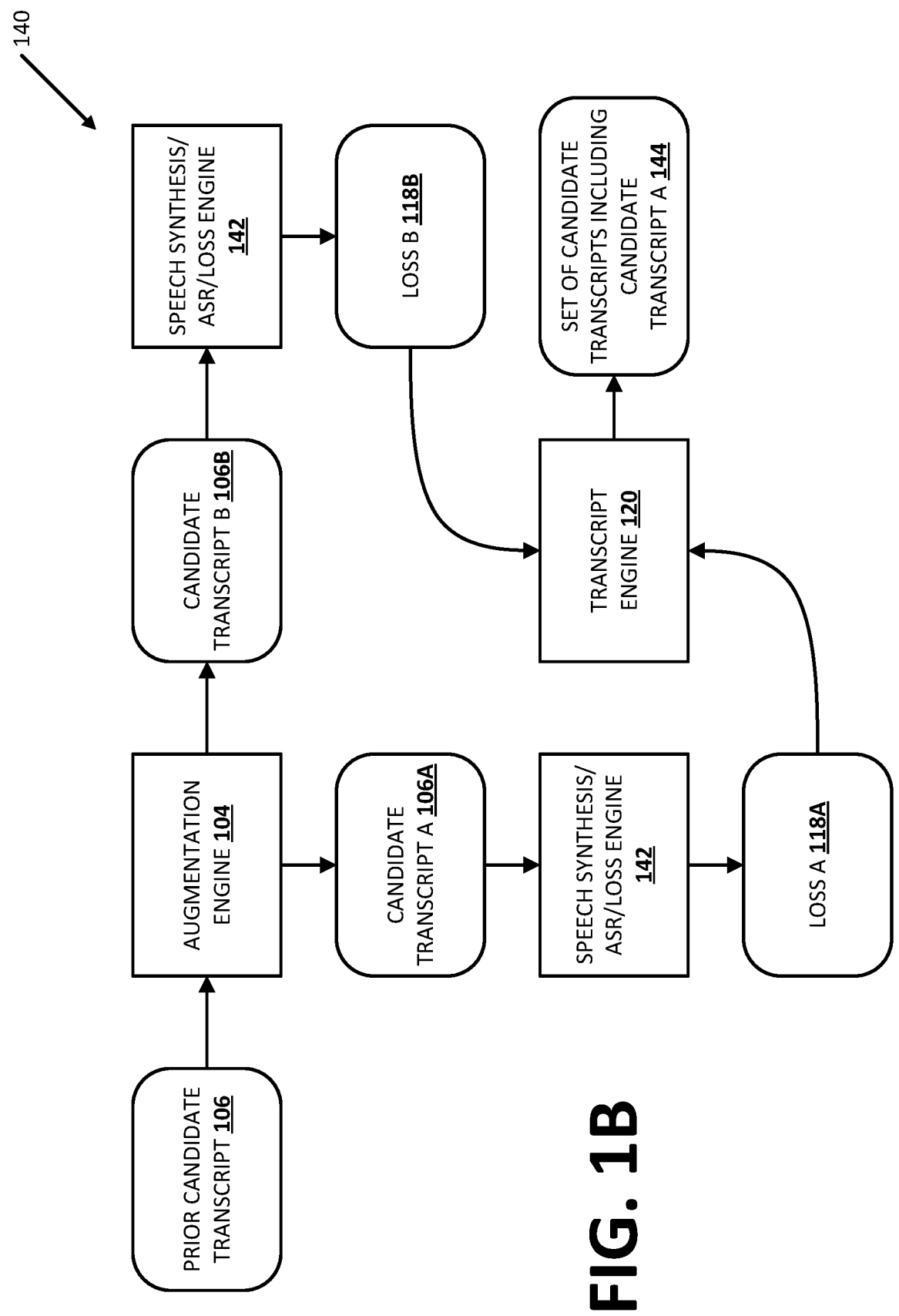
FIG. 1B illustrates an additional example of generating a set of candidate transcripts in accordance with various implementations disclosed herein.

FIG. 1B illustrates an example 140 of generating multiple candidate transcripts based on the same prior candidate transcript in accordance with various implementations. Example 140 includes processing prior candidate transcript 106 using augmentation engine 104 to generate candidate transcript A 106A and candidate transcript B 106B. The system in example 140 generates two candidate transcripts 106A and 106B based on the prior candidate transcript. In contrast, the example 100 generates a single candidate transcript 106 based on the prior candidate transcript. Candidate transcript A 106A can be processed using speech synthesis model/ASR model/loss engine 142 to generate a corresponding loss A 118A. In some implementations, the speech synthesis model/ASR model/loss engine 142 can include speech synthesis model 108, ASR model 112, and loss engine 116 described with respect to FIG. 1A. Similarly, candidate transcript B 106B can be processed using the speech synthesis model/ASR model/loss engine 142 to generate a corresponding loss B 118B.

In some implementations, transcript engine 120 can select one or more of the candidate transcripts (e.g., the system can select candidate transcript A 106A, candidate transcript B 106B, or candidate transcript A 106A and candidate transcript B 106B) based on the corresponding losses for further augmentation as described herein. Additionally or alternatively, transcript engine 120 can determine whether the candidate transcript is long enough (e.g., reached a predefined length value, reached an end of sentence character, etc.), and determine whether each of the candidate transcripts are examples of unintentional memorization based on the corresponding losses.

Figure 1C:
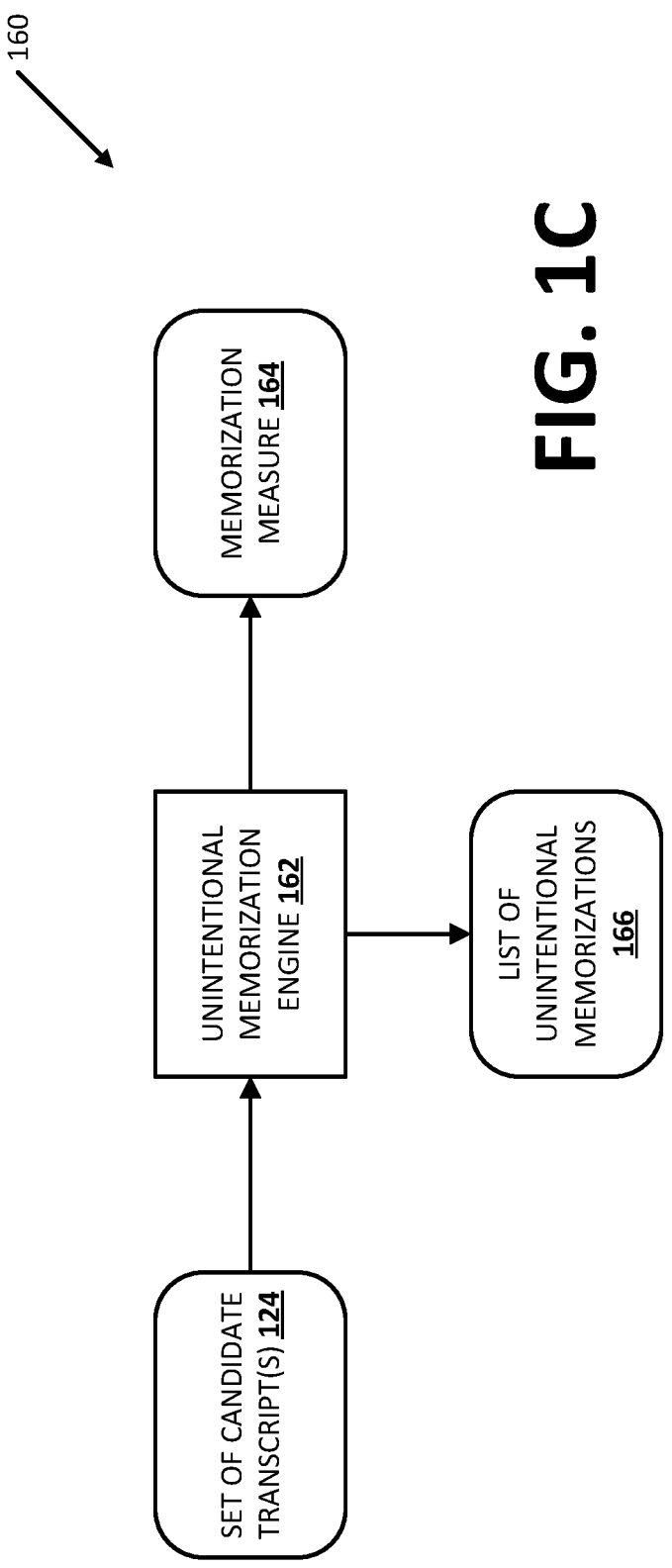
FIG. 1C illustrates an example of generating a memorization measure in accordance with various implementations disclosed herein.

FIG. 1C illustrates an example 160 of generating a memorization measure in accordance with various implementations. Example 160 includes processing the set of candidate transcripts 124 using the unintentional memorization engine 162 to generate a list of unintentional memorization 166. In some implementations, the unintentional memorization engine 162 can compare the set of candidate transcripts 124 with one or more candidate transcripts generated based on the vocabulary of an alternative ASR model (not depicted). For example, the system can compare the set of candidate transcripts 124 generated based on ASR model 112 with an additional set of candidate transcripts (not depicted) generated based on an additional ASR model (not depicted), such as an additional ASR model trained using publicly available data (i.e., training instances based on publicly available data). Sensitive data (e.g., passwords, credit card numbers, etc.) is unlikely to be publicly available and therefore unlikely to be included in training instances based on publicly available data. In other words, a candidate transcript generated based on the additional ASR model trained using publicly available data, the candidate transcript is unlikely to be an unintentional memorization. In some implementations, unintentional memorization engine 162 can compare the set of candidate transcripts 124 with the additional set of transcripts. If a given candidate transcript is in the set of candidate transcripts 124 and is in the additional set of candidate transcripts, the given candidate transcript is not an unintended memorization. In some of those implementations, the unintended memorization engine 162 can not include the given candidate transcript in the list of unintentional memorization 166.

Additionally or alternatively, the unintended memorization engine 162 can generate the memorization measure 164. In some implementations, the memorization measure 164 can be based on the number of unintentional memorization in the list of unintentional memorization 166. For example, the unintentional memorization engine 162 can generate a memorization measure of 10 based on a list of 10 example unintentional memorizations. In other words, each unintentional memorization can add one point to the unintentional memorization measure. However, this is merely illustrative and the memorization measure can be based on additional or alternative metrics, such as 0.5 points for each unintentional memorization, one point for each unintentional memorization that occurs more than once, one point for each unique unintentional memorization, and/or combinations thereof.

Figure 2:
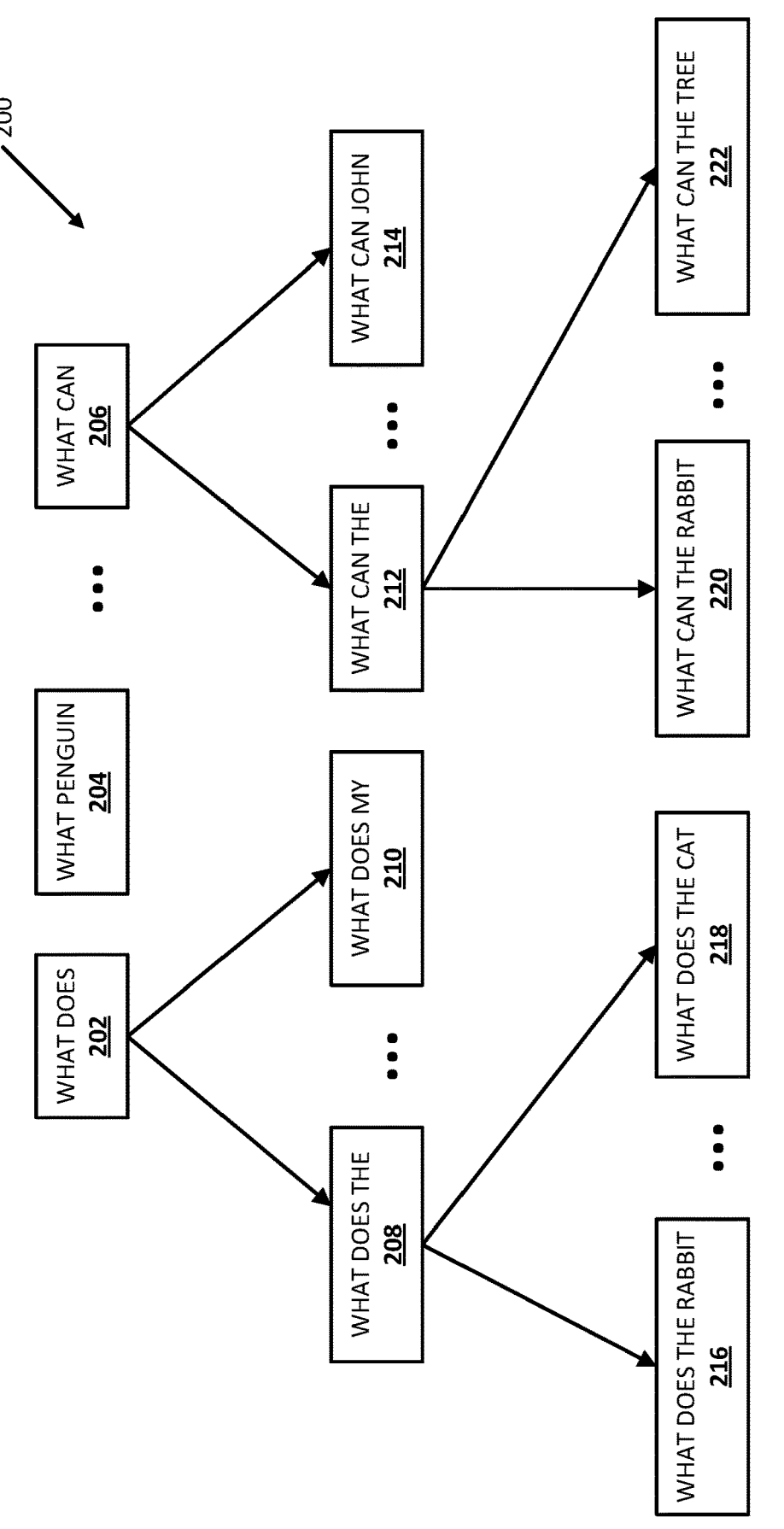
FIG. 2 is a block diagram illustrating an example of generating a set of candidate transcripts in accordance with various implementations disclosed herein.

FIG. 2 illustrates an example 200 of generating candidate transcripts in accordance with various implementations. In some implementations, candidate transcripts can be generated based on one or more candidate transcripts generated in a previous iteration. At an initial iteration, the candidate transcripts can be seeded based on token(s) of a vocabulary of an ASR model. In some implementations, the tokens of the vocabulary can include one or more words, one or more word-pieces, one or more letters, one or more phonemes, one or more additional portions of the vocabulary, and/or combinations thereof. The illustrated example 200 uses words of the vocabulary of the ASR model in generating the candidate transcripts. In some implementations, the system can generate initial candidate transcripts where each word in the vocabulary corresponds to a distinct candidate transcript (not depicted). Example 200 includes an initial set of candidate transcripts 202, 204, . . . , 206 which are based on the previous candidate transcript of 'WHAT'. The initial set includes candidate transcript 202 of 'WHAT DOES', candidate transcript 204 of 'WHAT PENGUIN', . . . , and candidate transcript 206 of 'WHAT CAN'. Although only three candidate transcripts are illustrated in the initial set of candidate transcripts, the system can include one or more additional candidate transcripts, where each additional candidate transcript can be based on an additional token in the vocabulary of the ASR model.

The system can process the initial set of candidate transcripts 202, 204, . . . , 206 to generate a loss corresponding to each candidate transcript. In some implementations, a loss corresponding to a candidate transcript can be generated in accordance with FIG. 1A and process 500 of FIG. 5 described herein. In some of those implementations, the loss can be generated using the loss engine 116 described herein.

In some implementations, the system can select one or more of the candidate transcripts for further processing based on the corresponding losses. In some of those implementations, the system can select one or more of the candidate transcripts with the smallest corresponding losses. For example, the candidate transcript 202 of 'WHAT DOES' can have a corresponding loss of 0.01, the candidate transcript 204 of 'WHAT PENGUIN' can have a corresponding loss of 0.05, and the candidate transcript 602 of 'WHAT CAN' can have a corresponding loss of 0.02. The system in example 200, the system selects the two candidate transcripts with the smallest losses. In other words, the system selects the candidate transcript 202 of 'WHAT DOES' with a corresponding candidate loss of 0.01 (which is smaller than 0.02 and 0.05) and the candidate transcript 206 of 'WHAT CAN' with a corresponding candidate loss of 0.02 (which is smaller than 0.05). However, this is merely illustrative, and in some other implementations the system can select alternatively numbers of candidate transcripts.

Candidate transcript 202 of 'WHAT DOES' can be augmented using one or more additional words in the vocabulary of the ASR. As illustrated herein, candidate transcript 202 can be augmented to generate candidate transcript 208, . . . , candidate transcript 210. For example, the candidate transcript 202 of 'WHAT DOES' can be augmented with the word 'THE' to generate the candidate transcript 208 of 'WHAT DOES THE'. Similarly, the candidate transcript 202 of 'WHAT DOES' can be augmented with the word 'MY' to generate the candidate transcript 210 of 'WHAT DOES MY'. Additionally or alternatively, candidate transcript 206 of 'WHAT CAN' can be augmented using one or more additional words in the vocabulary of the ASR to generate candidate transcript 212, . . . , candidate transcript 214. For example, the candidate transcript 206 of 'WHAT CAN' can be augmented with the word 'THE' to generate the candidate transcript 212 of 'WHAT CAN THE'. Similarly, the candidate transcript 206 of 'WHAT CAN' can be augmented with the word 'JOHN' to generate the candidate transcript 214 of 'WHAT CAN JOHN'.

The system can process the augmented set of candidate transcripts 208, . . . , 210 and 212, . . . , 214 to generate a loss corresponding to each candidate transcript. In some implementations, a loss corresponding to a candidate transcript can be generated in accordance with FIG. 1A and process 500 of FIG. 5 described herein. In some of those implementations, the loss can be generated using the loss engine 116 described herein. For example, the system can generate a loss of 0.1 corresponding to candidate transcript 208, a loss of 0.7 corresponding to the candidate transcript 210, a loss of 0.2 corresponding to the candidate transcript 212, and a loss of 0.4 corresponding to the candidate transcript 214.

In example 200, the system selects the two candidate transcripts with the smallest corresponding losses for additional augmentation. In other words, the system can select candidate transcript 208 with a corresponding loss of 0.1 and candidate transcript 212 with a corresponding loss of 0.2.

In some implementations, candidate transcript 208 of 'WHAT DOES THE' can be augmented using one or more words in the vocabulary of the ASR. For example, candidate transcript 208 of 'WHAT DOES THE' can be augmented with the word 'RABBIT' to generate the further augmented candidate transcript 216 of 'WHAT DOES THE RABBIT'. Similarly, candidate transcript 208 of 'WHAT DOES THE' can be augmented with the word 'CAT' to generate the further augmented candidate transcript 218 of 'WHAT DOES THE CAT'. Additionally or alternatively, candidate transcript 212 of 'WHAT CAN THE' can be augmented with the word 'RABBIT' to generate the further augmented candidate transcript 220 of 'WHAT CAN THE RABBIT'. Similarly, candidate transcript 212 of 'WHAT CAN THE' can be augmented with the word 'TREE' to generate the further augmented candidate transcript 222 of 'WHAT CAN THE TREE'.

In some implementations, the system can continue generating augmented candidate transcripts until a target length of the transcript is reached. In some of those implementations, the target length can be predefined. In some implementations, the system can continue generating one or more augmented candidate transcripts until an ending token (e.g., end of word, end of character, end of sentence, end of paragraph, etc.) is reached.

In some implementations, the system can determine the set of unintentional memorization based on the augmented candidate transcripts. For example, the system can process the candidate transcripts using unintentional memorization engine 162 described herein to determine the set of unintentional memorization. Additionally or alternatively, the system can determine a memorization measure based on the augmented candidate transcripts. In some implementations, the system can process the set of candidate transcripts using the unintentional memorization engine 162 described herein to determine the memorization measure.

Figure 3:
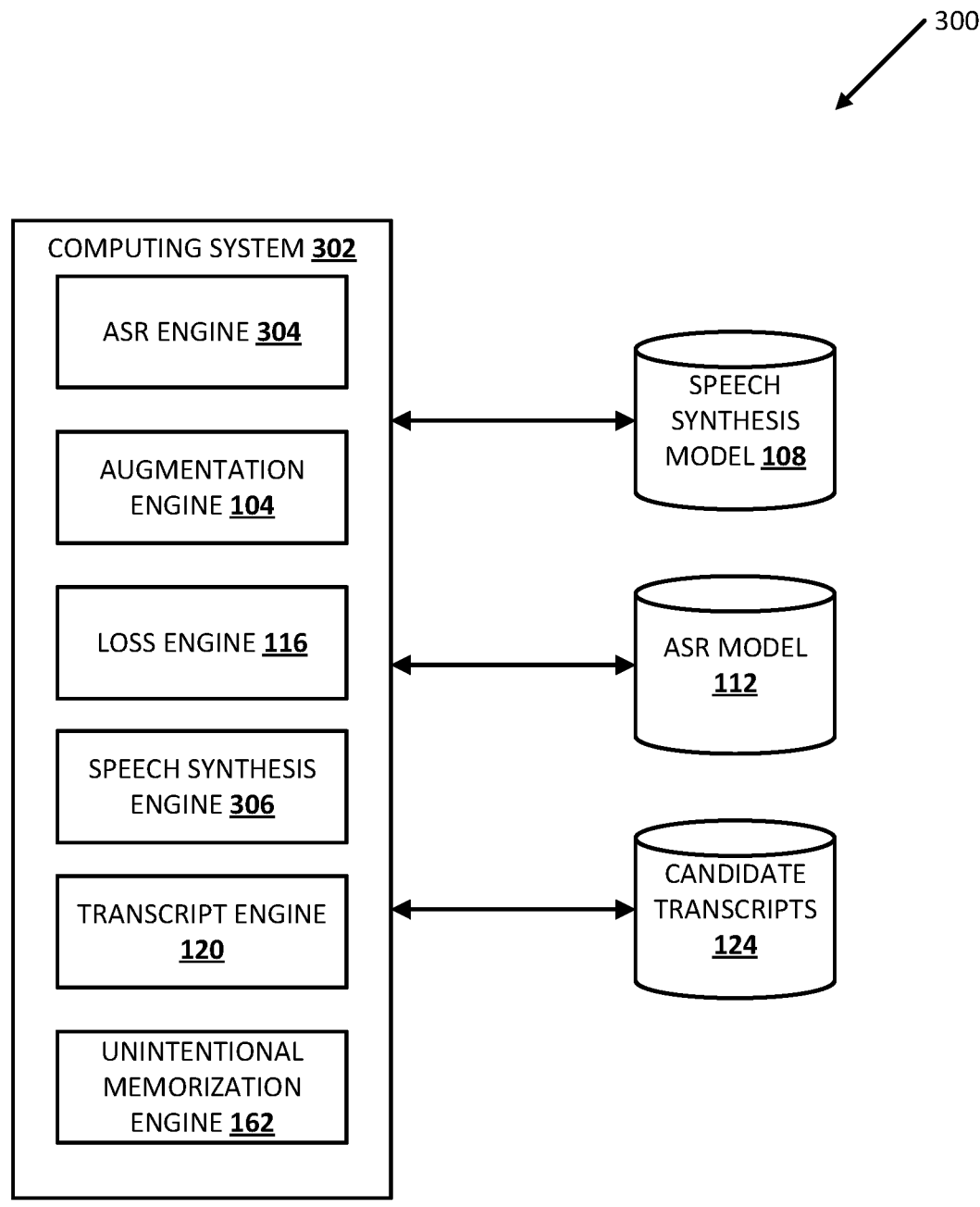
FIG. 3 illustrates an example environment in which various implementations described herein may be implemented.

FIG. 3 illustrates a block diagram of an example environment 300 in which various implementations may be implemented. The example environment 300 includes a computing system 302 which can include ASR engine 304, augmentation engine 104, loss engine 116, speech synthesis engine 306, transcript engine 120, unintentional memorization engine 162, and/or one or more additional engines. Additionally or alternatively, computing system 302 may be associated with speech synthesis model 108, ASR model 112, candidate transcripts 124, and/or one or more additional components (not depicted).

In some implementations, computing system 302 may include user interface input/output devices (not depicted), which may include, for example, a physical keyboard, a touch screen (e.g., implementing a virtual keyboard or other textual input mechanisms), a microphone, a camera, a display screen, and/or speaker(s). Additionally or alternatively, computing system 302 can include a variety of sensors (not depicted) such as an accelerometer, a gyroscope, a Global Positioning System (GPS), a pressure sensor, a light sensor, a distance sensor, a proximity sensor, a temperature sensor, one or more additional sensors, and/or combinations thereof. The user interface input/output devices may be incorporated with one or more computing systems 302 of a user. For example, a mobile phone of the user may include the user interface input output devices; a standalone digital assistant hardware device may include the user interface input/output device; a first computing device may include the user interface input device(s) and a separate computing device may include the user interface output device(s); etc. In some implementations, all or aspects of computing system 302 may be implemented on a computing system that also contains the user interface input/output devices. In some implementations computing system 302 may include an automated assistant (not depicted), and all or aspects of the automated assistant may be implemented on computing device(s) that are separate and remote from the client device that contains the user interface input/output devices (e.g., all or aspects may be implemented "in the cloud"). In some of those implementations, those aspects of the automated assistant may communicate with the computing device via one or more networks such as a local area network (LAN) and/or a wide area network (WAN) (e.g., the Internet).

Some non-limiting examples of computing system 302 include one or more of: a desktop computing device, a laptop computing device, a standalone hardware device at least in part dedicated to an automated assistant, a tablet computing device, a mobile phone computing device, a computing device of a vehicle (e.g., an in-vehicle communications system, and in-vehicle entertainment system, an in-vehicle navigation system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided. Computing system 302 may include one or more memories for storage of data and software applications, one or more processors for accessing data and executing applications, and other components that facilitate communication over a network. The operations performed by computing system 302 may be distributed across multiple computing devices. For example, computing programs running on one or more computers in one or more locations can be coupled to each other through a network.

In some implementations, ASR engine 304 can process a given instance of audio data using ASR model 112 to generate a text representation of an utterance captured in the given instance of audio data. For example, ASR engine 304 can use ASR model 112 to process synthesized speech audio data 110 to generate ASR output 114.

In some implementations, augmentation engine 104 can be used to generate one or more candidate transcripts 124. In some implementations, the candidate transcripts 124 can be generated based on the vocabulary corresponding to ASR model 112. For example, augmentation engine 104 can generate one or more candidate transcripts 124 in accordance with process 400 described herein.

In some implementations, loss engine 116 can be used to determine a loss between a candidate transcript and a text representation of the candidate transcript captured in synthesized speech audio data. For example, the system can use loss engine 116 to generate a loss 118 based on comparing candidate transcript 106 and ASR output 114, where the ASR output 114 is based on processing synthesized speech audio data 110 using ASR model 112.

In some implementations, speech synthesis engine 306 can process a candidate transcript using speech synthesis model 108 to generate an instance of synthesized speech audio data, where the synthesized speech audio data includes at least a synthesized representation of the corresponding candidate transcript. For example, speech synthesis engine 306 can use speech synthesis model 108 to process candidate transcript 106 to generate an instance of synthesized speech audio data 110.

In some implementations, transcript engine 120 can be used to generate one or more candidate transcripts 124. In some of those implementations, the one or more candidate transcripts 124 can be generated based on the vocabulary of ASR model 112. For example, transcript engine 120 can generate candidate transcripts as illustrated herein with respect to FIG. 2.

In some implementations, unintentional memorization engine 162 can be used to determine a memorization measure based on the ASR model 112. In some implementations, unintentional memorization engine 162 can generate the memorization measure in accordance with process 400 of FIG. 4 described herein.

FIG. 4 is a flowchart illustrating an example process 400 of performing action(s) based on a set of candidate transcripts and/or a memorization measure in accordance with various implementations disclosed herein. For convenience, the operations of the flowchart are described with reference to a system that performs the operations. This system may include various components of various computer systems, such as one or more components of computing system 302, client device 602, and/or computing system 710. Moreover, while operations of process 400 are shown in a particular order, this is not meant to be limiting. One or more operations may be reordered, omitted, and/or added.

At block 402, the system generates a set of candidate transcripts based on a vocabulary of an ASR model. In some implementations, the ASR model unintentionally memorized one or more occurrences of a human speaking each of the candidate transcripts while training the ASR model. In some implementations, the system can generate the set of candidate transcripts in accordance with process 500 described herein.

At block 404, the system generates a memorization measure based on the set of candidate transcripts of the ASR model. In some implementations, the system can process the set of candidate transcripts using unintentional memorization engine 162 to generate the memorization measure described herein. In some implementations, the system can compare the set of candidate transcripts generated based on the ASR model with an additional set of candidate transcripts generated based on an additional ASR model. In some of those implementations, the additional ASR model can be a model trained using publicly available training data (e.g., training data based on uploads to a video sharing platform, etc.). Candidate transcripts generated based on publicly available training data are unlikely to contain sensitive information, and therefore are unlikely to indicate an unintentional memorization by the ASR model. In some implementations, the system can disregard a given candidate transcript when generating the memorization measure at block 404 if the given candidate transcript occurs in both the set of candidate transcripts and the additional set of candidate transcripts.

In some implementations, the memorization measure can be generated based on the number of candidate transcripts in the set of candidate transcripts. In some implementations, the memorization measure can be based on the total number of candidate transcripts in the set of candidate transcripts. For example, the system can generate a set of 50 candidate transcripts at block 402, where the system can determine a memorization measure of 50 based on the set of 50 candidate transcripts (i.e., assign a defined number of points to each candidate transcript).

At block 406, the system performs one or more actions based on the set of candidate transcripts and/or the memorization measure. In some implementations, the system can use the memorization measure in evaluating training of the ASR model. For example, the system can determine an initial memorization measure based on an initial version of an ASR model. The system can perform one or more training techniques to update the ASR model to generate an updated ASR model. Subsequent to generating the updated ASR model, the system can generate an updated memorization measure. In some implementations, the system can determine whether the training increased or decreased the unintentional memorization in the ASR model based on comparing the initial memorization measure with the updated memorization measure. Additionally or alternatively, the system can determine whether to release the updated version of the ASR model based on comparing the initial memorization measure with the updated memorization measure.

FIG. 5 is a flowchart illustrating an example process 400 of determining whether an ASR model unintentionally memorized one or more occurrences of a human speaking a candidate transcript in accordance with various implementations described herein. For convenience, the operations of the flowchart are described with reference to a system that performs the operations. This system may include various components of various computer systems, such as one or more components of computing system 302, client device 602, and/or computing system 710. Moreover, while operations of process 500 are shown in a particular order, this is not meant to be limiting. One or more operations may be reordered, omitted, and/or added.

At block 502, the system generates a candidate transcript by augmenting a prior candidate transcript based on a vocabulary of an ASR model. In some implementations, at an initial iteration, the prior candidate transcript can be initialized based on a token of the vocabulary of the ASR model. In some of those implementations, the token can include one or more letters, one or more phonemes, one or more words, one or more phrases, one or more additional tokens, and/or combinations thereof of the vocabulary of the ASR model.

In some implementations, the prior candidate transcript can be augmented based on a token of the vocabulary ASR model. In some of those implementations, multiple candidate transcripts can be generated based on a given prior candidate transcript, where each candidate transcript is generated by augmenting the given prior candidate transcript with a distinct token of the vocabulary of the ASR model. In some implementations, the candidate transcript can be generated using augmentation engine 104 described herein. Additionally or alternatively, in some implementations, the candidate transcript can be generated in accordance with FIG. 2 described herein. For example, the system can generate the candidate transcript 208 of 'WHAT DOES THE' by augmenting the prior candidate transcript 202 of 'WHAT DOES' with the word 'THE' as described herein in FIG. 2.

At block 504, the system generates synthesized speech audio data by processing the candidate transcript using a speech synthesis model. In some implementations, the synthesized speech audio data includes a synthesized spoken representation of the candidate transcript. In some implementations, the system can generate the synthesized speech audio data by processing the candidate transcript using speech synthesis engine 306 and/or speech synthesis model 108 described herein. For example, the system can process the candidate transcript 208 of 'WHAT DOES THE' using the speech synthesis model 108 to generate synthesized speech audio data which includes a synthesized spoken representation of "what does the".

At block 506, the system generates ASR output by processing the synthesized speech audio data using the ASR model. In some implementations, the ASR output can include a candidate text representation of the synthesized speech of the candidate transcript. Additionally or alternatively, the ASR output can include a probability indicating the likelihood a token in the candidate text representation is a corresponding portion of the synthesized speech audio data. Furthermore, the ASR output can include one or more alternative candidate text representations of the synthesized speech captured in the audio data. For example, the system can process the synthesized speech audio data capturing a synthesized spoken representation of "what does the" to generate a candidate text representation of the synthesized speech of "what does the". In some implementations, the synthesized speech audio data generated at block 504 can be processed using ASR model 112 to generate the ASR output.

At block 508, the system generates a loss based on comparing the candidate transcript and the ASR output. For example, the system can compare the text of the candidate transcript and the text of the ASR output to generate the loss. In some implementations, the system can generate the loss using loss engine 116 described herein.

At block 510, the system determines, based on the loss, whether the ASR model unintentionally memorized one or more occurrences of a human speaking the candidate transcript used in training the ASR model. In some implementations, the system can determine whether the ASR model unintentionally memorized one or more occurrences of a human speaking the candidate transcript in training the ASR model using unintentional memorization engine 162 described herein.

Figure 6:
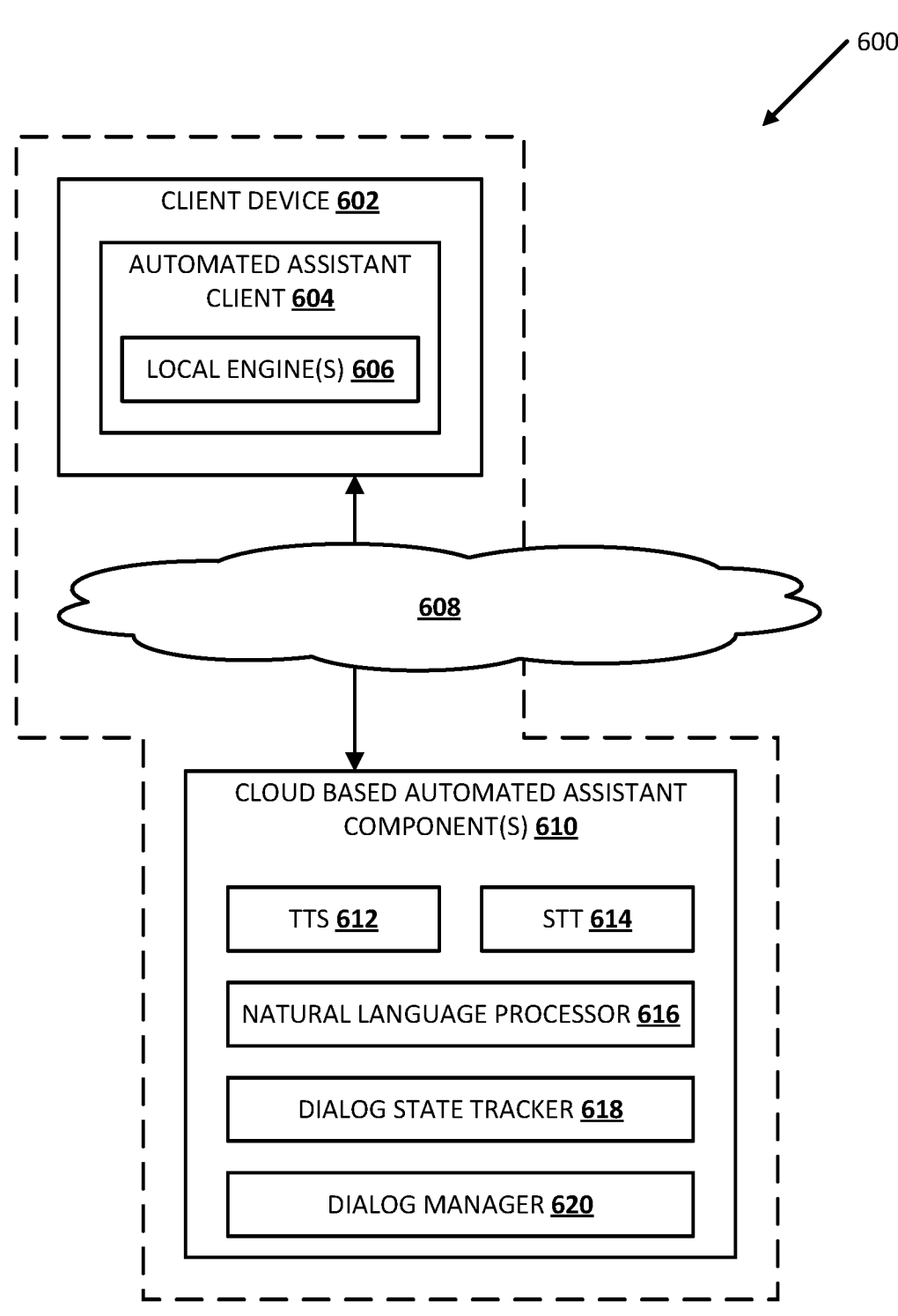
FIG. 6 illustrates another example environment in which various implementations disclosed herein may be implemented.

Turning now to FIG. 6, an example environment is illustrated where various implementations can be performed. FIG. 6 is described initially, and includes a client computing device 602, which executes an instance of an automated assistant client 604. One or more cloud-based automated assistant components 610 can be implemented on one or more computing systems (collectively referred to as a "cloud" computing system) that are communicatively coupled to client device 602 via one or more local and/or wide area networks (e.g., the Internet) indicated generally at 608.

An instance of an automated assistant client 604, by way of its interactions with one or more cloud-based automated assistant components 610, may form what appears to be, from the user's perspective, a logical instance of an automated assistant 600 with which the user may engage in a human-to-computer dialog. An instance of such an automated assistant 600 is depicted in FIG. 6. It thus should be understood that in some implementations, a user that engages with an automated assistant client 604 executing on client device 602 may, in effect, engage with his or her own logical instance of an automated assistant 600. For the sakes of brevity and simplicity, the term "automated assistant" as used herein as "serving" a particular user will often refer to the combination of an automated assistant client 604 executing on a client device 602 operated by the user and one or more cloud-based automated assistant components 610 (which may be shared amongst multiple automated assistant clients of multiple client computing devices). It should also be understood that in some implementations, automated assistant 600 may respond to a request from any user regardless of whether the user is actually "served" by that particular instance of automated assistant 600.

The client computing device 602 may be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided. In various implementations, the client computing device 602 may optionally operate one or more other applications that are in addition to automated assistant client 604, such as a message exchange client (e.g., SMS, MMS, online chat), a browser, and so forth. In some of those various implementations, one or more of the other applications can optionally interface (e.g., via an application programming interface) with the automated assistant 600, or include their own instance of an automated assistant application (that may also interface with the cloud-based automated assistant component(s) 610).

Automated assistant 600 engages in human-to-computer dialog sessions with a user via user interface input and output devices of the client device 602. To preserve user privacy and/or to conserve resources, in many situations a user must often explicitly invoke the automated assistant 600 before the automated assistant will fully process a spoken utterance. The explicit invocation of the automated assistant 600 can occur in response to certain user interface input received at the client device 602. For example, user interface inputs that can invoke the automated assistant 600 via the client device 602 can optionally include actuations of a hardware and/or virtual button of the client device 602. Moreover, the automated assistant client can include one or more local engines 606, such as an invocation engine that is operable to detect the presence of one or more spoken invocation phrases. The invocation engine can invoke the automated assistant 600 in response to detection of one of the spoken invocation phrases. For example, the invocation engine can invoke the automated assistant 600 in response to detecting a spoken invocation phrase such as "Hey Assistant," "OK Assistant", and/or "Assistant". The invocation engine can continuously process (e.g., if not in an "inactive" mode) a stream of audio data frames that are based on output from one or more microphones of the client device 602, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 600. As used herein, "invoking" the automated assistant 600 can include causing one or more previously inactive functions of the automated assistant 600 to be activated. For example, invoking the automated assistant 600 can include causing one or more local engines 606 and/or cloud-based automated assistant components 610 to further process audio data frames based on which the invocation phrase was detected, and/or one or more following audio data frames (whereas prior to invoking no further processing of audio data frames was occurring).

The one or more local engine(s) 606 of automated assistant 600 are optional, and can include, for example, the augmentation engine, the loss engine, the transcript engine, and the unintentional memorization engine described above, a local voice-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 602 is relatively constrained in terms of computing resources (e.g., processor cycles, memory, battery, etc.), the local engines 606 may have limited functionality relative to any counterparts that are included in cloud-based automated assistant components 610.

Cloud-based automated assistant components 610 leverage the virtually limitless resources of the cloud to perform more robust and/or more accurate processing of audio data, and/or other user interface input, relative to any counterparts of the local engine(s) 606. Again, in various implementations, the client device 602 can provide audio data and/or other data to the cloud-based automated assistant components 610 in response to the invocation engine detecting a spoken invocation phrase, or detecting some other explicit invocation of the automated assistant 600.

The illustrated cloud-based automated assistant components 610 include a cloud-based TTS module 612, a cloud-based STT module 614, a natural language processor 616, a dialog state tracker 618, and a dialog manager 620. In some implementations, one or more of the engines and/or modules of automated assistant 600 may be omitted, combined, and/or implemented in a component that is separate from automated assistant 600. Further, in some implementations automated assistant 600 can include additional and/or alternative engines and/or modules. Cloud-based STT module 614 can convert audio data into text, which may then be provided to natural language processor 616.

Cloud-based TTS module 612 can convert textual data (e.g., natural language responses formulated by automated assistant 600) into computer-generated speech output. In some implementations, TTS module 612 may provide the computer-generated speech output to client device 602 to be output directly, e.g., using one or more speakers. In other implementations, textual data (e.g., natural language responses) generated by automated assistant 600 may be provided to one of the local engine(s) 606, which may then convert the textual data into computer-generated speech that is output locally.

Natural language processor 616 of automated assistant 600 processes free form natural language input and generates, based on the natural language input, annotated output for use by one or more other components of the automated assistant 600. For example, the natural language processor 616 can process natural language free-form input that is textual input that is a conversion, by STT module 614, of audio data provided by a user via client device 602. The generated annotated output may include one or more annotations of the natural language input and optionally one or more (e.g., all) of the terms of the natural language input.

In some implementations, the natural language processor 616 is configured to identify and annotate various types of grammatical information in natural language input. In some implementations, the natural language processor 616 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, the natural language processor 816 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there." In some implementations, one or more components of the natural language processor 616 may rely on annotations from one or more other components of the natural language processor 616. In some implementations, in processing a particular natural language input, one or more components of the natural language processor 616 may use related prior input and/or other related data outside of the particular natural language input to determine one or more annotations.

In some implementations, dialog state tracker 618 may be configured to keep track of a "dialog state" that includes, for instance, a belief state of a one or more users' goals (or "intents") over the course of a human-to-computer dialog session and/or across multiple dialog sessions. In determining a dialog state, some dialog state trackers may seek to determine, based on user and system utterances in a dialog session, the most likely value(s) for slot(s) that are instantiated in the dialog. Some techniques utilize a fixed ontology that defines a set of slots and the set of values associated with those slots. Some techniques additionally or alternatively may be tailored to individual slots and/or domains. For example, some techniques may require training a model for each slot type in each domain.

Dialog manager 620 may be configured to map a current dialog state, e.g., provided by dialog state tracker 618, to one or more "responsive actions" of a plurality of candidate responsive actions that are then performed by automated assistant 600. Responsive actions may come in a variety of forms, depending on the current dialog state. For example, initial and midstream dialog states that correspond to turns of a dialog session that occur prior to a last turn (e.g., when the ultimate user-desired task is performed) may be mapped to various responsive actions that include automated assistant 600 outputting additional natural language dialog. This responsive dialog may include, for instance, requests that the user provide parameters for some action (i.e., fill slots) that dialog state tracker 618 believes the user intends to perform. In some implementations, responsive actions may include actions such as "request" (e.g., seek parameters for slot filling), "offer" (e.g., suggest an action or course of action for the user), "select," "inform" (e.g., provide the user with requested information), "no match" (e.g., notify the user that the user's last input is not understood), a command to a peripheral device (e.g., to turn off a light bulb), and so forth.

Figure 7:
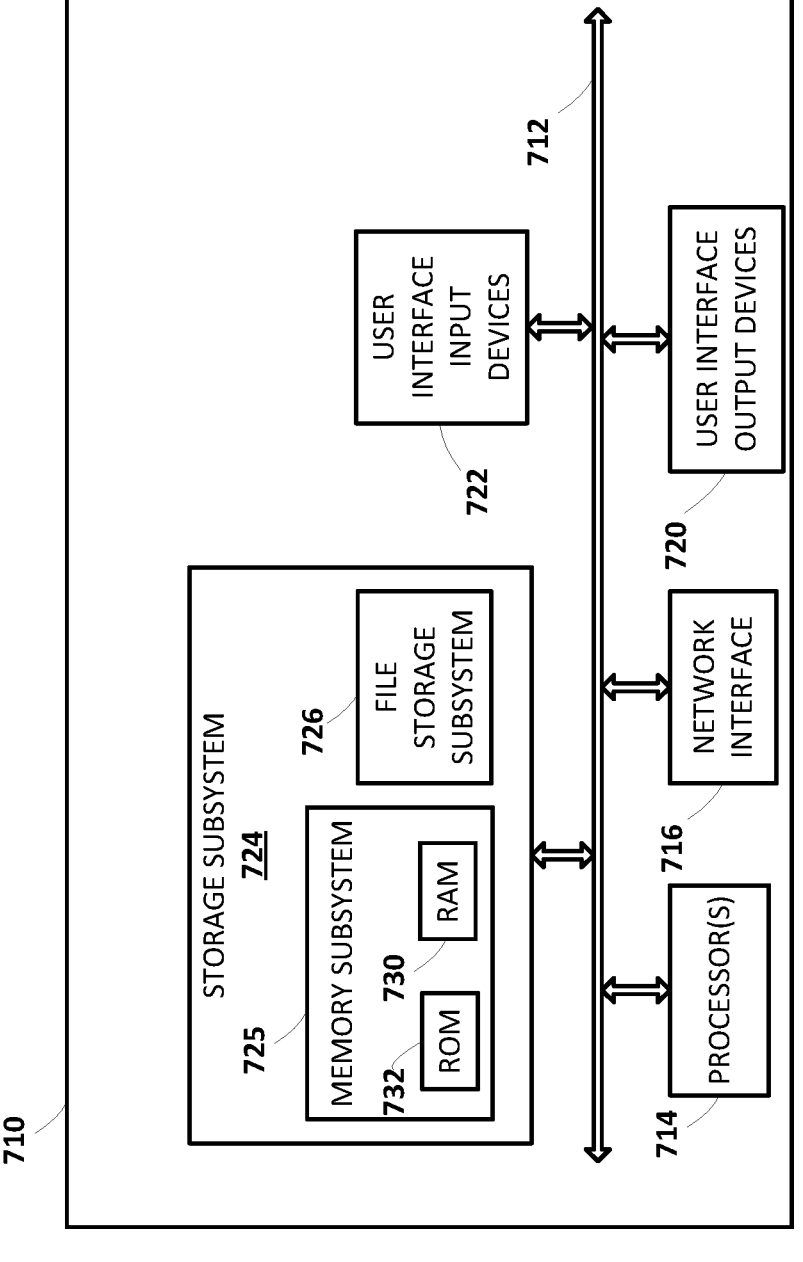
FIG. 7 illustrates an example architecture of a computing device.

FIG. 7 is a block diagram of an example computing device 710 that may optionally be utilized to perform one or more aspects of techniques described herein. In some implementations, one or more of a client computing device, and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 925 and a file storage subsystem 726, user interface output devices 720, user interface input devices 922, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of one or more of the processes of FIG. 4 and/or FIG. 5, as well as to implement various components depicted in FIG. 3 and/or FIG. 6.

These software modules are generally executed by processor 714 alone or in combination with other processors. Memory 725 used in the storage subsystem 724 can include a number of memories including a main random access memory ("RAM") 730 for storage of instructions and data during program execution and a read only memory ("ROM") 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, the method includes generating a candidate transcript using a vocabulary corresponding to an automatic speech recognition ("ASR") model. In some implementations, the method further includes generating, based on processing the candidate transcript using a speech synthesis model, synthesized speech audio data that includes synthesized speech of the candidate transcript. In some implementations, the method further includes processing the synthesized speech audio data using the ASR model to generate ASR output that reflects a predicted text representation of the synthesized speech. In some implementations, the method further includes generating a loss based on comparison of the ASR output to the candidate transcript. In some implementations, the method further includes determining, based on the loss, whether the ASR model unintentionally memorized one or more occurrences, in training data used to train the ASR model, of a corresponding human speaking the candidate transcript. In some implementations, the method further includes generating an overall memorization measure as a function of the determination of whether the ASR model unintentionally memorized the one or more occurrences.

These and other implementations of the technology can include one or more of the following features.

In some implementations, generating the candidate transcript using the vocabulary corresponding to the ASR model includes, prior to generating the candidate transcript, generating a prior candidate transcript using the vocabulary corresponding to the ASR model, wherein the prior candidate transcript includes a beginning portion of words of the candidate transcript but lacks one or more ending words of the candidate transcript. In some implementations, the method further includes generating, based on processing the prior candidate transcript using the speech synthesis model, prior synthesized speech audio data that includes prior synthesized speech of the prior candidate transcript. In some implementations, the method further includes processing the prior synthesized speech audio data using the ASR model to generate prior ASR output that reflects a prior predicted text representation of the synthesized speech. In some implementations, the method further includes generating a prior loss based on comparison of the prior ASR output to the prior candidate transcript. In some implementations, the method further includes selecting, based on the prior loss, the prior candidate transcript for augmentation. In some versions of those implementations, prior to generating the candidate transcript, the method further includes generating an additional prior candidate transcript using the vocabulary corresponding to the ASR model, wherein the additional prior candidate transcript includes a beginning portion of words of the prior candidate transcript but lacks one or more ending words of the prior candidate transcript. In some implementations, the method further includes generating, based on processing the additional prior candidate transcript using the speech synthesis model, additional prior synthesized speech audio data that includes synthesized speech of the additional prior candidate transcript. In some implementations, the method further includes processing the additional prior synthesized speech audio data using the ASR model to generate additional prior ASR output that reflects an additional prior predicted text representation of the additional prior synthesized speech. In some implementations, the method further includes generating an additional prior loss based on comparison of the additional prior ASR output to the additional prior candidate transcript. In some implementations, the method further includes selecting, based on (a) the prior loss of the prior candidate transcript and (b) the additional prior loss of the additional prior candidate transcript, the prior candidate transcript for augmentation instead of the additional prior candidate transcript.

In some implementations, generating the loss based on comparison of the ASR output to the candidate transcript includes generating the loss based on comparing a transcript portion of the ASR output with the candidate transcript.

In some implementations, generating the loss based on comparison of the ASR output to the candidate transcript includes, for each word in the candidate transcript, comparing a probability portion of the ASR output of a corresponding portion of the ASR output with the word in the candidate transcript. In some implementations, the method further includes generating the loss based on the comparing.

In some implementations, the method further includes determining, based on the overall memorization measure for the ASR model, whether to utilize a particular technique in federated training of the ASR model and/or of an additional machine learning model.

In some implementations, the method further includes transmitting, in response to a request by a third party, the overall memorization measure.

In some implementations, the method further includes transmitting, in response to a request by a third party, the candidate transcript.

In some implementations, the vocabulary corresponding to the ASR model comprises a set of tokens, a set of characters, a set of letters, a set of words, a set of word-pieces, and/or a set of phonemes.

In some implementations, a method implemented by one or more processors is provided, the method includes receiving an automatic speech recognition ("ASR") model and a vocabulary corresponding to the ASR model. In some implementations, the method further includes generating, based on the vocabulary of the ASR model, a set of candidate transcripts. In some implementations, for each candidate transcript in the set of candidate transcripts, the method further includes generating, based on processing the candidate transcript using a speech synthesis model, synthesized speech audio data that includes synthesized speech of the candidate transcript. In some implementations, the method further includes processing the synthesized speech audio data using the ASR model to generate ASR output that reflects a predicted text representation of the synthesized speech. In some implementations, the method further includes generating a loss based on comparison of the ASR output to the candidate transcript. In some implementations, the method further includes determining, based on the loss, whether the ASR model unintentionally memorized one or more occurrences, in training data used to train the ASR model, of a corresponding human speaking the candidate transcript.

These and other implementations of the technology can include one or more of the following features.

In some implementations, the method further includes generating an overall memorization measure as a function of the determination whether the ASR model unintentionally memorized the one or more occurrences corresponding to one or more candidate transcripts in the set of candidate transcripts. In some versions of those implementations, the method further includes identifying a subset of candidate transcripts, wherein the loss corresponding to each of the candidate transcripts in the subset of candidate transcripts indicates a probability indicating the ASR model unintentionally memorized the corresponding one or more occurrences satisfies a threshold value. In some versions of those implementations, receiving the ASR model and the vocabulary corresponding to the ASR model includes receiving the ASR model and the vocabulary from a third party, and further comprising transmitting the subset of candidate transcripts to the third party.

In some implementations, the training data used to train the ASR model includes one or more targeted training instances and further including determining whether the set of candidate transcripts includes the one or more targeted training instances. In some implementations, the method further includes determining an overall memorization measure as a function of whether the set of candidate transcripts includes the one or more targeted training instances.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:

generating a candidate transcript using a vocabulary corresponding to an automatic speech recognition ("ASR") model;

generating, based on processing the candidate transcript using a speech synthesis model, synthesized speech audio data that includes synthesized speech of the candidate transcript;

processing the synthesized speech audio data using the ASR model to generate ASR output that reflects a predicted text representation of the synthesized speech;

generating a loss based on comparison of the ASR output to the candidate transcript;

determining, based on the loss that is based on the comparison of the ASR output to the candidate transcript, whether the ASR model unintentionally memorized one or more occurrences, in training data used to train the ASR model, of a corresponding human speaking the candidate transcript;

generating an overall memorization measure as a function of the determination of whether the ASR model unintentionally memorized the one or more occurrences;

determining, based on the overall memorization measure, whether to transmit the ASR model to a plurality of client devices; and in response to determining, based on the overall memorization measure, to transmit the ASR model to the plurality of client devices:

transmitting, to the plurality of client devices, the ASR model or weights of the ASR model.

2. The method of claim 1, wherein generating the candidate transcript using the vocabulary corresponding to the ASR model comprises:

prior to generating the candidate transcript:

generating a prior candidate transcript using the vocabulary corresponding to the ASR model, wherein the prior candidate transcript includes a beginning portion of words of the candidate transcript but lacks one or more ending words of the candidate transcript;

generating, based on processing the prior candidate transcript using the speech synthesis model, prior synthesized speech audio data that includes prior synthesized speech of the prior candidate transcript;

processing the prior synthesized speech audio data using the ASR model to generate prior ASR output that reflects a prior predicted text representation of the prior synthesized speech;

generating a prior loss based on comparison of the prior ASR output to the prior candidate transcript; and selecting, based on the prior loss, the prior candidate transcript for augmentation.

3. The method of claim 2, further comprising:

prior to generating the candidate transcript:

generating an additional prior candidate transcript using the vocabulary corresponding to the ASR model, wherein the additional prior candidate transcript includes a beginning portion of words of the prior candidate transcript but lacks one or more ending words of the prior candidate transcript;

generating, based on processing the additional prior candidate transcript using the speech synthesis model, additional prior synthesized speech audio data that includes synthesized speech of the additional prior candidate transcript;

processing the additional prior synthesized speech audio data using the ASR model to generate additional prior ASR output that reflects an additional prior predicted text representation of the additional prior synthesized speech;

generating an additional prior loss based on comparison of the additional prior ASR output to the additional prior candidate transcript; and selecting, based on (a) the prior loss of the prior candidate transcript and (b) the additional prior loss of the additional prior candidate transcript, the prior candidate transcript for augmentation instead of the additional prior candidate transcript.

4. The method of claim 1, wherein generating the loss based on comparison of the ASR output to the candidate transcript comprises:

generating the loss based on comparing a transcript portion of the ASR output with the candidate transcript.

5. The method of claim 1, wherein generating the loss based on comparison of the ASR output to the candidate transcript comprises:

for each word in the candidate transcript, comparing a probability portion of the ASR output of a corresponding portion of the ASR output with the word in the candidate transcript; and generating the loss based on the comparing.

6. The method of claim 1, further comprising:

determining, based on the overall memorization measure for the ASR model, whether to utilize a particular technique in federated training of the ASR model and/or of an additional machine learning model.

7. The method of claim 1, further comprising:

transmitting, in response to a request by a third party, the overall memorization measure.

8. The method of claim 1, further comprising:

transmitting, in response to a request by a third party, the candidate transcript.

9. The method of claim 1, wherein the vocabulary corresponding to the ASR model comprises a set of tokens, a set of characters, a set of letters, a set of words, a set of word-pieces, and/or a set of phonemes.

10. The method of claim 1, wherein determining, based on the overall memorization measure, whether to transmit the ASR model to a plurality of client devices comprises:

comparing the overall memorization measure to a prior memorization measure generated based on prior weights of the ASR model, wherein the weights of the ASR model are updated relative to the prior weights of the ASR model.

11. The method of claim 10, wherein the weights of the ASR model are updated based on client model updates from the plurality of client devices, the client model updates from the plurality of client devices being based on client gradients locally generated at the client devices.

12. A method implemented by one or more processors, the method comprising:

receiving an automatic speech recognition ("ASR") model and a vocabulary corresponding to the ASR model;

generating, based on the vocabulary of the ASR model, a set of candidate transcripts;

for each candidate transcript in the set of candidate transcripts:

generating, based on processing the candidate transcript using a speech synthesis model, synthesized speech audio data that includes synthesized speech of the candidate transcript;

processing the synthesized speech audio data using the ASR model to generate ASR output that reflects a predicted text representation of the synthesized speech;

generating a loss based on comparison of the ASR output to the candidate transcript;

determining, based on the loss that is based on the comparison of the ASR output to the candidate transcript, whether the ASR model unintentionally memorized one or more occurrences, in training data used to train the ASR model, of a corresponding human speaking the candidate transcript;

determining, based on whether the ASR model unintentionally memorized the one or more occurrences of the corresponding human speaking the candidate transcript, whether to transmit the ASR model to a plurality of client devices; and in response to determining to transmit the ASR model to the plurality of client devices:

transmitting, to the plurality of client devices, the ASR model or weights of the ASR model.

13. The method of claim 12, further comprising:

generating an overall memorization measure as a function of the determination of whether the ASR model unintentionally memorized the one or more occurrences corresponding to one or more candidate transcripts in the set of candidate transcripts.

14. The method of claim 13, further comprising:

identifying a subset of candidate transcripts, wherein the loss corresponding to each of the candidate transcripts in the subset of candidate transcripts indicates a probability indicating the ASR model unintentionally memorized the corresponding one or more occurrences satisfies a threshold value.

15. The method of claim 14, wherein receiving the ASR model and the vocabulary corresponding to the ASR model comprises receiving the ASR model and the vocabulary from a third party, and further comprising transmitting the subset of candidate transcripts to the third party.

16. The method of claim 12, wherein the training data used to train the ASR model includes one or more targeted training instances and further comprising:

determining whether the set of candidate transcripts includes the one or more targeted training instances; and determining an overall memorization measure as a function of whether the set of candidate transcripts includes the one or more targeted training instances.

\* \* \* \* \*